United States Patent
Jung

(10) Patent No.: US 7,212,904 B2
(45) Date of Patent: May 1, 2007

(54) CONSTANT SPEED CONTROL METHOD FOR VEHICLE ON INCLINED ROAD

(75) Inventor: Kil-Young Jung, Seoul (KR)

(73) Assignee: Kia Motors Corporation, Yangjae-Dong, Seocho-Ku, Seoul (KR)

( * ) Notice: Subject to any disclaimer, the term of this patent is extended or adjusted under 35 U.S.C. 154(b) by 350 days.

(21) Appl. No.: 10/916,252

(22) Filed: Aug. 11, 2004

(65) Prior Publication Data

US 2005/0038590 A1     Feb. 17, 2005

(30) Foreign Application Priority Data

Aug. 11, 2003     (KR) ...................... 10-2003-0055351

(51) Int. Cl.
*G06F 7/00* (2006.01)
(52) U.S. Cl. ........................................... 701/93
(58) Field of Classification Search .................. 701/93; 180/170
See application file for complete search history.

(56) References Cited

U.S. PATENT DOCUMENTS 4,335,428 A * 6/1982 Miki et al. ..................... 701/65
4,850,656 A * 7/1989 Ise et al. ..................... 303/192

* cited by examiner

*Primary Examiner*—Thu V. Nguyen
(74) *Attorney, Agent, or Firm*—Morgan Lewis & Bockius LLP

(57) ABSTRACT

A constant speed control method for a vehicle on an inclined road allows a constant speed control allowance to be one mile per hour on a flat road and two miles per hour on an inclined surface. If the vehicle speed decelerates two or more times of 1.5 miles per hour or more compared to the preset speed, the vehicle is assumed to be on a slope. A control system is performed by changing the constant speed control allowance from one mile per hour to two miles per hour. If the vehicle speed is within the allowance for 20 seconds, the control system on the inclined road is released. Thus, engine noise according to the frequent change of the T.P.S. value is prevented in advance and frequent gearshifts due to the rapid increment of the T.P.S. value is also prevented, resulting in a stable constant driving speed.

7 Claims, 3 Drawing Sheets

CONSTANT SPEED CONTROL METHOD FOR VEHICLE ON INCLINED ROAD

CROSS-REFERENCE TO RELATED APPLICATION(S)

The present application is based on, and claims priority from, Korean Application Serial Number 10-2003-0055351, filed on Aug. 11, 2003, the disclosure of which is hereby incorporated by reference herein in its entirety.

FIELD OF THE INVENTION

Generally, the present invention relates to a constant speed control method for a vehicle on an inclined road. More particularly, the method is adapted to detect whether the vehicle is on a slope and to set a constant speed control standard for both a flat road and inclined surface, thereby preventing engine noise and gearshifts generated when the value of a Throttle Position Sensor (T.P.S.) is rapidly increased, and further, stabilizing a constant driving speed of the vehicle.

BACKGROUND OF THE INVENTION

Typically, a vehicle constant speed system detects the speed of the vehicle in real-time, receives speed information previously defined by a user (e.g., 34 miles per hour or more), and controls a throttle body of the engine to thereby allow the vehicle to be driven at a desired speed estimated by the user. In the conventional constant speed system a control operation for maintaining the constant vehicle speed within ±1 mile per hour of a preset speed is as described below.

When the actual vehicle speed increases one mile per hour or more compared to the preset speed, the constant driving speed unit lowers the engine Revolutions Per Minute (RPM) by decreasing the T.P.S. value, thereby, gradually closing the throttle body via a constant driving speed cable. As a result, the actual vehicle speed is restored to within one mile per hour of the preset speed. If the actual vehicle speed decreases one mile per hour or more in relation to the preset speed, the constant driving speed system unit increases the engine RPM by increasing the T.P.S., thereby rapidly opening the throttle body and maintaining the actual vehicle speed within —1 mile per hour of the preset speed.

However, there is a drawback in the conventional constant speed system that has a control system thus described. The engine is often overstrained to maintain the constant speed even when the vehicle rapidly decelerates, such as on an inclined road, thereby causing engine noise and frequent gearshifts. Under a rapid deceleration state on an inclined road, the conventional constant driving speed system carries out an acceleration control to maintain the speed. Thus, the T.P.S. value of the engine changes rapidly and significantly, and the engine noise increases in response to the increment of the vehicle speed. However, when the vehicle speed increases, the actual vehicle speed exceeds the predetermined speed allowance of one mile per hour due to the rapid change of the T.P.S. value. Thus, the constant driving speed system reduces the T.P.S. value of the engine by re-starting the deceleration control and decelerates the actual vehicle speed and the above operation is repeated. In short, when driving on a slope, engine noise continuously occurs due to the presence of a repeated rapid deceleration.

SUMMARY OF THE INVENTION

An embodiment of the present invention provides a method to detect whether a vehicle, having a constant speed system, is on a slope and to set a constant speed control standard for both a flat road and inclined surface. Thus, preventing engine noise and frequent gearshifts generated by a rapid increase of a T.P.S. value and, thereby, stabilizing the constant driving speed of the vehicle.

The constant speed control allowance is preferably one mile per hour on a flat road and two miles per hour on an inclined surface. If the vehicle speed decelerates two or more times of 1.5 miles per hours or more compared to the preset speed, the vehicle is assumed to be on a slope. A control system on an inclined road is performed by changing the constant speed control allowance from one mile per hour to two miles per hour. If the vehicle speed is within the allowance for about 20 seconds, the control system on the inclined road is released. Thus, engine noise based on the frequent changing of the T.P.S. value on a slope is prevented. Furthermore, frequent gearshifts due to rapid increment of the T.P.S. value is also prevented, resulting in a stable constant driving speed.

BRIEF DESCRIPTION OF THE DRAWINGS

For a better understanding of the nature and objects of the present invention, reference should be made to the following detailed description, read in conjunction with the accompanying drawings, in which.

DETAILED DESCRIPTION OF EMBODIMENTS

Figure 1:
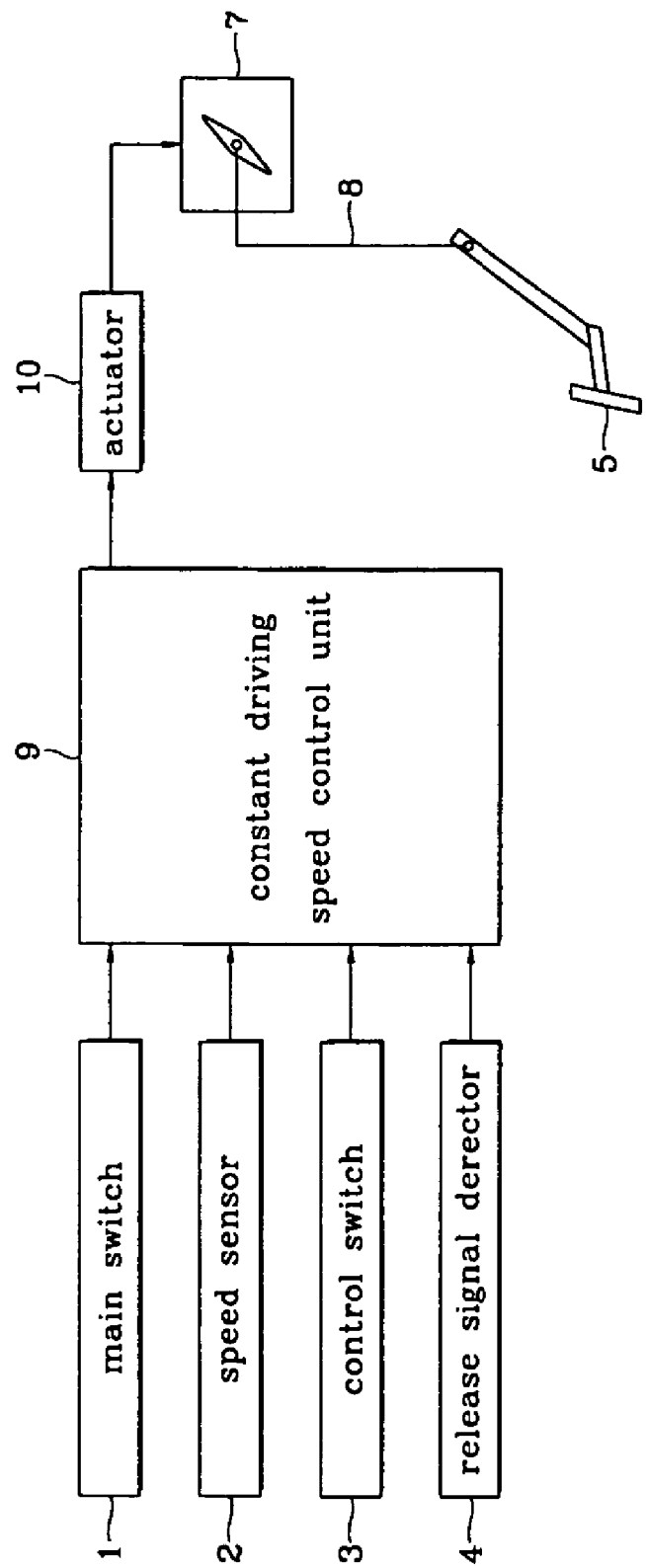
FIG. 1 is a block diagram of an apparatus applied with a method according to an embodiment of the present invention.

Referring to FIG. 1, an apparatus applying a method of the present invention includes a main switch 1 that either activates or deactivates the apparatus. A speed sensor 2, installed at a transmission cable, cluster, or the like, detects the vehicle speed via an electrical signal. A control switch 3 sets a constant driving speed and detects an acceleration, deceleration, or restoration of the original system and the like. A release signal detector 4 generates a cruise releasing signal by detecting operation of a brake switch, shifting a shift lever into neutral, operation state of a clutch switch, or the like. A cable 8 controls the openness of a throttle body 7 on the basis of the depressed degree of an accelerator pedal 5. A constant driving speed control unit 9 performs a predetermined program by receiving output signals from each of the above component parts. The constant driving speed control unit 9 substantially carries out a control activation according to the constant driving speed. An actuator 10 controls the engine Revolutions Per Minute (RPM) by restraining the openness of the throttle value 7 according to an output signal of the constant driving speed control unit 9.

Figure 2:
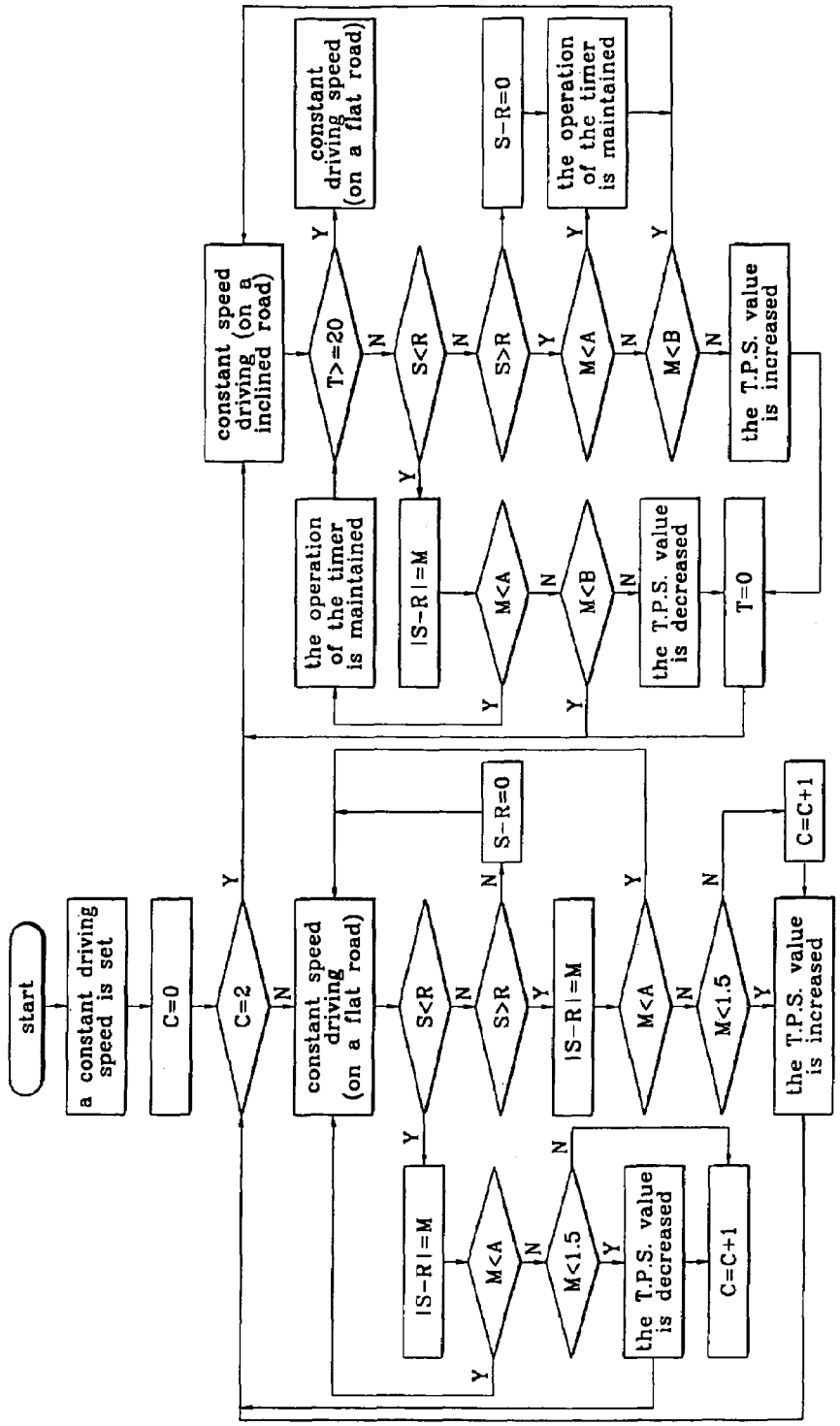
FIG. 2 is a flowchart depicting a method according to an embodiment of the present invention.
Figure 3:
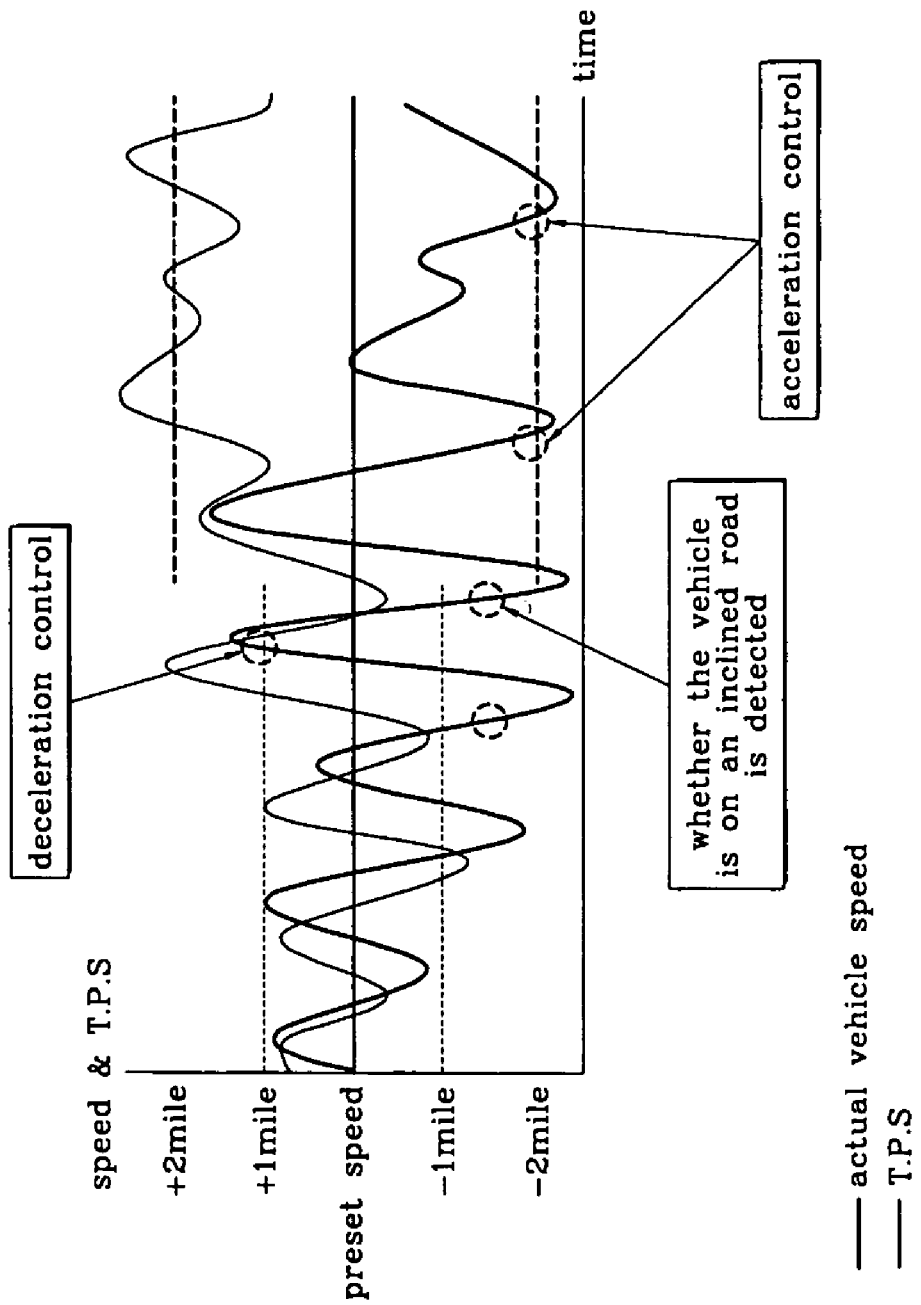
FIG. 3 is a graph depicting an operation state of an actual vehicle speed and T.P.S. according to road conditions during a vehicle traveling at a constant speed according to an embodiment of the present invention.

With reference to FIGS. 2 and 3, a constant speed control method for a vehicle on a slope includes multiple steps. Initially, the method detects whether a counted value of a counter (C) is two after clearing a counted value of the counter to zero, wherein the counted value indicates the number of times the vehicle's speed accelerates or decelerates of 1.5 miles per hour or more compared to a preset speed (S) set by the user. Next, the method executes the vehicle to drive at a constant drive speed set for a flat road surface if the counted value of the counter is not equal to two and detects whether an actual vehicle speed (R) is greater than the preset speed (S).

The method then detects whether a speed differential value (M) is smaller than a constant speed control allowance on a flat road surface (A) (e.g., one mile per hour). Wherein the speed differential value (M) is calculated by an absolute value of the subtraction of the actual vehicle speed (R) from the preset speed (S) under the condition of S<R. The method also detects whether the speed differential value (M) is less than 1.5 miles per hour (M<1.5 miles per hour) if M is greater than or equal to A (i.e., M≧A). Next, the method adds one to the counted value of the counter if M≧1.5 miles per hour and decreases the T.P.S. value like the condition under M<1.5 miles per hour. Thereafter, the system returns to the step of detecting whether the counted value of the counter is two.

The method also maintains a constant speed driving mode on a flat road surface when the preset speed (S) is neither less nor greater than the actual vehicle speed (R) (neither S<R nor S>R) and the subtraction between the preset speed (S) and actual vehicle speed (R) is assumed to be zero. If the actual vehicle speed (R) is slower than the preset speed (S) (i.e., S>R), the method detects whether the speed differential value (M) is less than the constant speed control allowance on a flat road surface (A) wherein the speed differential value (M) is calculated by deducting the actual vehicle speed (R) from the preset speed (S).

The method also detects whether the speed differential value (M) is less than 1.5 miles per hour (M<1.5 miles per hour) if M is not smaller than A (i.e., M≧A). If the speed differential value (M) is greater than or equal to 1.5 miles per hour (M≧1.5 miles per hour), the method increases the T.P.S. value after increasing the counted value of the counter by one, and then returns to the step of detecting whether the counted value of the counter is two.

A constant speed driving mode is executed on an inclined surface if the counted value of the counter is two and if the speed differential value (M) is less than a constant speed control allowance on the inclined road (B) for 20 seconds or more the method returns to a constant speed driving mode on a flat road surface. If the state of M<B is maintained less than 20 seconds, then detect whether the preset speed (S) is less than the actual vehicle speed (R); wherein the speed differential value (M) is determined by the preset speed estimated by the user and actual vehicle speed.

The method determines whether the actual vehicle speed (R) is faster than the preset speed (S) (i.e., S<R), and if so, calculates the speed differential value (M) by using an absolute value of the subtraction between the preset speed and actual vehicle speed (S−R). Then the method detects whether the calculated speed differential value (M) is smaller than the constant speed control allowance on a flat road surface. The method maintains the operation of the timer if M<A; however if M≧A, the method detects whether the speed differential value (M) is smaller than the constant speed control allowance on the inclined road (B) (e.g., 2 miles per hour) is detected.

The method then returns to the initial step of the constant driving speed on the inclined road after reducing the T.P.S. value and clearing the counted value of the counter to be zero, if the speed differential value (M) is greater than or equal to the constant speed control allowance on the inclined road (B) (i.e., M≧B). The method also maintains the operation of the timer when the preset speed (S) is neither less nor greater than the actual vehicle speed (R) (neither S<R nor S>R) and the subtraction between the preset speed (S) and actual vehicle speed (R) is assumed to be zero. The method also detects whether the speed differential value (M) is smaller than the constant speed control allowance on a flat road surface (A) only if the actual vehicle speed is slower than the preset speed (i.e., S>R).

The method also detects whether the speed differential value (M) is less than B (M<B) if M is not smaller than A (i. e., M≧A). If the speed differential value is less than B (M<B) the method returns to the constant speed driving mode on the inclined road. However, if the speed differential value is greater than or equal to B (i.e., M≧B), the method increases the T.P.S. value, sets the counted value of the timer to be zero, and returns to the initial step of constant driving speed on the inclined road.

The operation effect of the method of the present invention will now be described. The constant driving speed control unit 9 carries out a substantial control operation according to a constant driving speed by receiving output signals from each of the above parts and by performing a predetermined program. The constant driving speed control unit 9 clears a counted value of a counter to be zero when the main switch 1 is turned on by the user and a preset speed (S). A constant driving speed is set, wherein the counted value indicates the number of times a vehicle speed accelerates or decelerates more than or equal to 1.5 miles per hour compared to the preset speed (S), and the vehicle speed is detected via the vehicle speed sensor 2. Then, the constant driving speed control unit 9 detects whether the counted value of the counter is two to determine whether the vehicle speed decelerates two or more times of more than or equal to 1.5 miles per hour compared to the preset speed.

If the counted value of the counter is not equal to two, a constant speed driving mode on a flat road surface is executed. If the actual vehicle speed (R) is greater than the preset speed (S) (i.e., faster than the preset speed), then whether a speed differential value (M) is smaller than a constant speed control allowance on the flat road surface (A) (e.g., 1 mile per hour) is detected. The speed differential value (M) is calculated by an absolute value of the subtraction between the preset speed (S) and actual vehicle speed (R).

If the speed differential value (M) is greater than or equal to the constant speed control allowance on a flat road surface (A) (M≧A), then whether M is less than 1.5 miles per hour (M<1.5 miles per hour) is detected. Provided that M≧1.5 miles per hour, then the constant driving speed on a flat road is assumed to be increased by more than or equal to 1.5 miles per hour compared to the preset speed, thereby increasing the counted value of the counter by 1, decreasing the T.P.S. value by controlling the throttle value 7 via the actuator 10, and detecting whether the counted value of the counter is equal to two.

When the actual vehicle speed and preset speed are compared, if the preset speed (S) is neither less nor greater than the actual vehicle speed (R) (i.e., neither S<R nor S>R), it is assumed that S−R=0 and the constant driving speed on a flat road surface is maintained. After calculating a speed differential value (M) by the equation of S−R=M under the condition of S>R, whether M is less than the constant speed control allowance on the flat road surface (A) is detected.

When M≧A, whether the speed differential value (M) is less than 1.5 miles per hour (M<1.5 miles per hour) is detected. However, if M≧1.5 miles per hour, increasing the counted value of the counter by one, increasing the value of T.P.S. like the condition under M<1.5 miles per hour, and whether the counted value of the counter is two is detected. Provided that the counted value of the counter is two (i.e., the actual vehicle speed accelerates or decelerates two or more times for greater than or equal to 1.5 miles per hour compared to the preset speed under a constant driving control on the flat road), the vehicle is assumed to be driving on an inclined road, and a control for the constant driving speed on the inclined road is performed.

While driving on an inclined road at a constant speed, if the speed differential value of the preset speed and actual vehicle speed is less than a constant speed control allowance on the inclined road for 20 seconds or more, the vehicle is presumed to be driving on a flat road after being driven on an inclined road and the speed mode shifts to the constant driving speed on the flat road surface. On the other hand, if the vehicle moves less than 20 seconds under the condition of M<B, then the vehicle is assumed to be driving on an inclined road and detects whether the preset speed is smaller than the actual vehicle speed (S<R).

If the actual vehicle speed (R) is faster than the preset speed (S) (i.e., S<R), the speed differential value (M) is calculated by using an absolute value of the subtraction of S–R. Then, whether the calculated speed differential value (M) is smaller than the constant speed control allowance on a flat road surface (A) (e.g., one mile per hour) is detected.

If M<A, the operation of the timer is maintained. However, if M≧A, then whether the speed differential value (M) is smaller than the constant driving speed control allowance on the inclined road (B) (e.g., two miles per hour) is detected. If M≧B, returning to the step of the constant speed driving mode on the inclined road after reducing the T.P.S. value and clearing the counted value of the timer to be zero.

When the preset speed (S) is neither less nor greater than the actual vehicle speed (neither S<R nor S>R) in a constant driving speed mode on an inclined road and the subtraction between the preset speed (S) and actual vehicle speed (R) is assumed to be zero (S–R=0), then the operation of the timer is maintained. Whether the speed differential value (M) is smaller than the constant speed control allowance on a flat road surface is detected only if the actual vehicle speed is slower than the preset speed (i.e., S<R).

If M≧A and M<B (i.e., two miles per hour), the step for the constant speed driving on the inclined road is re-performed. However, if M≧B, returning to the step of the constant driving speed on the inclined road after increasing the T.P.S. value and setting the counted value of the timer to be zero. The actual vehicle speed on the slope rapidly decreases compared to that of the flat road surface. However, the actual vehicle speed is slowly affected by the T.P.S. value varying in response to the acceleration compared to the flat road surface. If the constant speed control allowance on the flat road surface (A) is one mile per hour, the T.P.S. value varies greatly such that a deceleration control is performed by exceeding +1 mile per hour. If the constant speed control allowance on the inclined road (B) is two miles per hour as described in the present invention, the deceleration control is not performed and the increased T.P.S. value is maintained.

Accordingly, as illustrated in FIG. 3, a periodic time repeatedly controlling the T.P.S. value of the vehicle (i.e., controlling the acceleration) becomes longer and the T.P.S. value decreases at each time, thereby preventing engine noise according to the frequent change of the T.P.S. value on the slope. Also, frequent gearshifts generated with respect to the rapid increase of the T.P.S. value are precluded beforehand.

In order to release the constant driving speed on both the flat road and inclined surface, the user depresses the brake pedal or clutch pedal, or shifts the shift lever into the neutral position. The vehicle speed should decelerates 15 Km/h or lower compared to the preset speed when the main switch is turned off, or the vehicle speed should deviate from the scope of the cruise operation speed (40±3–160/145±5 Km/h). The above signals are inputted into the constant driving speed control unit 9 via the release signal detector 4 for automatically performing a release of the constant speed system of the vehicle.

As apparent from the foregoing, there is an advantage in that whether a vehicle having a constant speed system is on a slope is detected, and a constant speed control standard on a flat road surface (e.g., one mile per hour) as well as an inclined road (e.g., two miles per hour) are set, thus contributing to a prevention of engine noise and frequent gearshift, and stabilizing the constant driving speed.

What is claimed is:

1. A constant speed control method for a vehicle, comprising:

detecting whether a counted value of a counter (C) is two after clearing a counted value of said counter to zero, wherein said counted value indicates the number of times a vehicle speed accelerates or decelerates more than or equal to 1.5 miles per hour compared to a preset speed (S) set by the user;

executing the vehicle to drive at a constant driving speed set for a flat road surface if said counted value of said counter is not equal to two, and detecting whether an actual vehicle speed (R) is greater than said preset speed (S);

a. if S<R, then:

detecting whether a speed differential value (M) is smaller than a constant speed control allowance on a flat road surface (A), wherein said speed differential value (M) is calculated by an absolute value of subtraction of said actual vehicle speed (R) from said preset speed (S);

detecting whether said speed differential value (M) is less than 1.5 miles per hour if M is greater than or equal to A;

adding one to the counted value of said counter if M≧1.5 miles per hour, decreasing a Throttle Position Sensor (T.P.S.) value like the condition under M<1.5 miles per hour, and returning to the step of detecting whether the counted value of said counter is two;

b. if S=R, then:

maintaining a constant speed driving mode on the flat road surface; and c. if S>R, then:

detecting whether said speed differential value (M) is less than said constant speed control allowance on a flat road surface (A), wherein said speed differential value (M) is calculated by deducting said actual vehicle speed (R) from said preset speed (S);

detecting whether said speed differential value (M) is less than 1.5 miles per hour if M is not smaller than A, and if said speed differential value (M) is greater than or equal to 1.5 miles per hour, increasing said T.P.S. value after increasing the counted value of said counter by one, and returning to the step of detecting whether the counted value of said counter is two;

executing a constant speed driving mode on an inclined road if the counted value of said counter is two, and a. if said speed differential value (M) is less than a constant speed control allowance on the inclined road (B) for 20 seconds or more, then returning to said constant speed driving mode on a flat road surface, and
b. if the state of M<B is maintained for less than 20 seconds, then detecting whether said preset speed (S) is less than said actual vehicle speed (R) wherein said speed differential value (M) is determined by said preset speed estimated by the user and said actual vehicle speed;

determining whether said actual vehicle speed (R) is faster than said preset speed (S), and if so, calculating said speed differential value (M) by using an absolute value of the subtraction between said preset speed and said actual vehicle speed (S−R), and then detecting whether the calculated speed differential value (M) is smaller than said constant speed control allowance on a flat road surface (A); then:

i. if M<A, then maintaining the operation of the timer, if M≧A, then determining whether said speed differential value (M) is smaller than said constant speed control allowance on the inclined road (B); if said speed differential value (M) is greater than or equal to said constant speed control allowance on the inclined road (B), then returning to the initial step of constant driving speed on the inclined road after reducing said T.P.S. value and clearing the counted value of said counter to be zero;

ii. if S=R, then maintaining operation of the timer;

iii. if S>R, detecting whether said speed differential value (M) is smaller than said constant speed control allowance on a flat road surface (A); and if M≧A, then detecting whether said speed differential value (M) is less than said constant speed control allowance on the inclined road (B), and if said speed differential value is less than B, then returning to the constant speed driving mode on the inclined road, however, if said speed differential value (M) is greater than or equal to B, increasing said T.P.S. value, setting the counted value of said timer to be zero, and returning to the initial step of constant driving speed on the inclined road.

2. A constant speed control method for a vehicle, comprising the steps of:

determining whether a speed differential value between an actual vehicle speed and a preset speed estimated by a user is higher than a predetermined standard value;

determining that the vehicle is being driven on an inclined road if a number of times said speed differential value exceeds said preset standard value is greater than or equal to a predetermined value; and executing a constant speed driving mode on the inclined road by applying a constant speed control allowance having a larger value than that of a constant speed control allowance on a flat road surface if the vehicle is determined to be driven on the inclined road.

3. The method as defined in claim 2, wherein said standard value is larger than said constant speed control allowance on a flat road surface.

4. The method as defined in claim 3, wherein said constant speed control allowance on the inclined road is larger than said standard value.

5. The method as defined in claim 2, wherein if the vehicle is determined to be driven on the inclined road and said speed differential value of said preset speed and said actual vehicle speed is smaller than said constant speed control allowance on the inclined road for more than or equal to 20 seconds, then said constant speed driving on the inclined road is released.

6. A computer program product for use in conjunction with a computer system, the computer program product comprising a computer readable storage medium and a computer program mechanism embedded therein, the computer program mechanism comprising:

instructions for determining a differential between an actual vehicle speed and a preset speed;

instructions for counting a number of times the differential exceeds a predetermined standard value; and instructions for executing an inclined surface constant speed driving mode wherein a larger constant speed control allowance than a constant speed control allowance for a substantially flat surface is applied if the counted number is greater than an predetermined value.

7. The computer program product of claim 6, further comprising instructions wherein if the speed differential value is smaller than the inclined surface constant speed driving mode for not less than about 20 seconds, the inclined surface constant speed driving mode is released.

* * * * *